United States Patent
Dannenhauer et al.

(10) Patent No.: US 6,537,341 B2
(45) Date of Patent: Mar. 25, 2003

(54) PROCESS FOR RECYCLING FIBER COMPOSITE MATERIALS

(75) Inventors: Fritz Dannenhauer, Hasel (DE); Petra Grundig, Ulm (DE); Maria-Theresia Sailer, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/866,918

(22) Filed: May 30, 2001

(65) Prior Publication Data

US 2002/0017162 A1 Feb. 14, 2002

(30) Foreign Application Priority Data

May 30, 2000 (DE) ......................................... 100 26 761

(51) Int. Cl.$^7$ ................................................ C22B 4/00
(52) U.S. Cl. ........................ 75/10.13; 75/403; 241/24.1
(58) Field of Search ................................ 75/10.13, 403; 241/24.1

(56) References Cited

U.S. PATENT DOCUMENTS

| | | | |
|---|---|---|---|
| 3,793,130 A | * | 2/1974 | Marzocchi ..................... 161/93 |
| 4,933,529 A | * | 6/1990 | Saville ................ 219/10.55 R |
| 5,304,576 A | * | 4/1994 | Martinez ...................... 521/41 |
| 5,578,700 A | * | 11/1996 | Hunt ........................... 528/501 |
| 6,143,376 A | | 11/2000 | Linn et al. ................... 427/557 |

FOREIGN PATENT DOCUMENTS

EP 0 636 428 7/1994

* cited by examiner

Primary Examiner—Melvyn Andrews
(74) Attorney, Agent, or Firm—Crowell & Moring LLP

(57) ABSTRACT

A process for recycling composite materials that comprise fibers and a matrix includes exposing the composite material to electromagnetic waves in the form of microwaves. The electromagnetic waves induce an introduction of energy into the composite material, leading to a separation of fibers and matrix. The separation operation can be assisted by a suitable solvent.

12 Claims, 3 Drawing Sheets

PROCESS FOR RECYCLING FIBER COMPOSITE MATERIALS

BACKGROUND AND SUMMARY OF INVENTION

This application claims the priority of German patent document No. 100 26 761.0, filed May 30, 2000, the disclosure of which is expressly incorporated by reference herein.

The present invention relates to a process for recycling composite materials that comprise fibers and a matrix.

A process of the generic type is known from EP 636 428. In this process, fiber composite materials with a reinforcement of carbon fibers are coked for one week in a four-stage process initially with the exclusion of oxygen, (i.e., the organic matrix is reduced to form carbon). In a subsequent step, a binder is admixed with the coking product, which comprises carbon and carbon fibers. This mixture is subjected to shaping and finally, once again, is coked to form a final carbon fiber-reinforced carbon (C/C). This process is used in particular for recycling prepreg waste materials which are formed during the production of C/C materials.

A drawback of this process is that it is very protracted and is only suitable for recycling carbon fiber-containing composite materials. Organic fibers, such as for example aramid fibers, would be destroyed in this process. Furthermore, the fibers are not separated from the matrix and consequently cannot be used to produce a different type of fiber composite material.

Accordingly, the present invention is based on the object of reprocessing fiber composite materials with an organic matrix in such a manner that the fibers can be separated from the matrix so that they can subsequently be made available again as a raw material.

The object is solved by a process according to the present invention, which provides for energy to be introduced into a composite material by electromagnetic waves.

The material phases of the composite material (matrix, fibers) absorb the electromagnetic waves to different extents. Usually, the matrix or parts of the matrix absorb the electromagnetic waves more strongly than the fibers. The result is selective heating of the matrix, which causes the matrix to breakdown and leads to separation between the fibers and the matrix. The fibers remain virtually in their original form, structure, and quality. Therefore, by far the majority of the processed fibers can be fed back to the production process for composite materials with only a slight reduction in quality. Possible reductions in quality result from the length of the reprocessed fibers, which in turn can be traced back to the degree of comminutation of the processed composite material. Accordingly, it is desirable to process pieces of the composite material which are as large as possible.

It is particularly advantageous to place the composite material in a solvent during the introduction of energy. This applies particularly to composite materials with organic matrices. As a result of the selective heating of the matrix, the polymer chains of the matrix are broken up, comminuted and directly dissolved in the solvent. Furthermore, the solvent assists with cleaving of the polymer chains. The fibers are not attacked by the solvent and are virtually completely separated from the matrix.

In the context of the process according to the present invention, it is advantageous if the matrix of the composite material has a higher dielectric loss factor than the fibers. This leads to a selective introduction of energy and a selective heating of the matrix, which then leads to separation of fibers and matrix.

The best results for the introduction of energy are achieved by electromagnetic waves in the microwave range between 300 MHz and 300 Ghz, which may be pulsed or continuous. A particularly advantageous frequency band is between 2 Ghz and 3 Ghz. Commercially available microwave generators which are also employed in other technical fields can be used for this purpose.

The solvent can also contribute to the transfer of energy to the matrix of the composite material if it absorbs microwaves and is heated. Moreover, the ability to dissolve organic molecules increases with the temperature of the solvent. It has proven advantageous to use polar solvents that absorb high levels of microwaves and in the process are heated. Polar protic solvents, such as for example phosphoric acid, sulphuric acid, nitric acid, acetic acid or citric acid, as well as polar aprotic solvents, such as for example water, (cyclo-) aliphatic and/or aromatic (poly)alcohols, (poly) esters, (poly)anhydrides, (poly)aminoalcohols, (poly) amines, (poly)amides, (poly)amidoamines, (poly)sulphones, (poly)sulphoxides or mixtures thereof, are particularly suitable. Moreover, it may be advantageous to add additives which additionally absorb microwaves, such as soot or ethanol, and/or to add additives which catalytically assist the dissolving action of the solvent, such as for example p-toluenesulphonic acid or organic bases, to the solvent.

When the process according to the present invention is assisted by a solvent, the solvent and the composite material have to be stored in a container. For this purpose, TEFLON® has proven to be an appropriate container material, since it is transparent to microwaves and is inert with respect to most solvents.

The container can be closed in a pressure-tight manner. An excess pressure is built up in the container as a result of the heating of the solvent, with the result that the action of the solvent is reinforced.

After the separating operation, the matrix has dissolved in the solvent while the fibers are floating in the solvent. To separate solvent and fibers, it is expedient for this mixture to be filtered, for example through a conventional filter paper. The fibers can then be removed from the filter, cleaned (for example with ethanol or distilled water) and fed back to the production process for composite materials.

The majority of fiber-reinforced composite materials have a matrix of organic materials, often thermoplastic and thermosetting plastic or synthetic resin matrices, such as for example epoxides, polyesters, polyamides, and polyimides or mixtures thereof. Matrices of this type can be separated very successfully from the fibers with the assistance of solvents. On the other hand, it is possible to use the process according to the present invention to separate composite materials with inorganic matrices. An example which may be mentioned in this context is carbon fiber-reinforced composite materials with a matrix of silicon carbide.

As with the matrices, the fibers may likewise be of organic nature (e.g. aramide fibers) or inorganic nature (e.g. carbon fibers, glass fibers, SiC fibers). Furthermore, mixtures of various types of fibers may be present. The process is particularly efficiently used for composite materials which are reinforced with carbon fibers, since there is currently a high demand and a price level for carbon fibers.

Other objects, advantages and novel features of the present invention will become apparent from the following detailed description of the invention when considered in conjunction with the accompanying drawings.

DETAILED DESCRIPTION OF THE DRAWINGS

Figure 1:
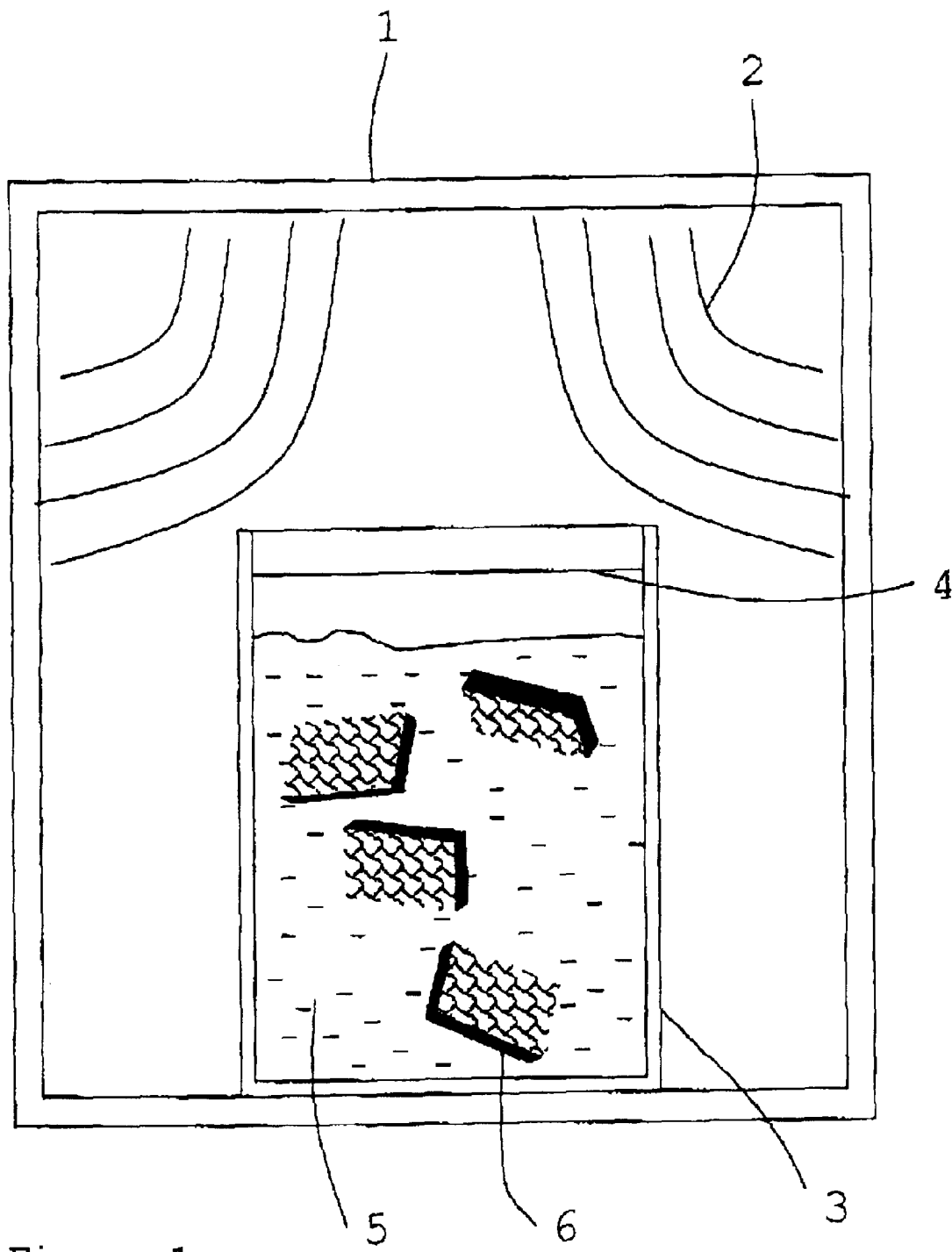
FIG. 1 shows an arrangement for carrying out the process according to the present invention, having a microwave oven and a container holding a solvent and a composite material.
Figure 2:
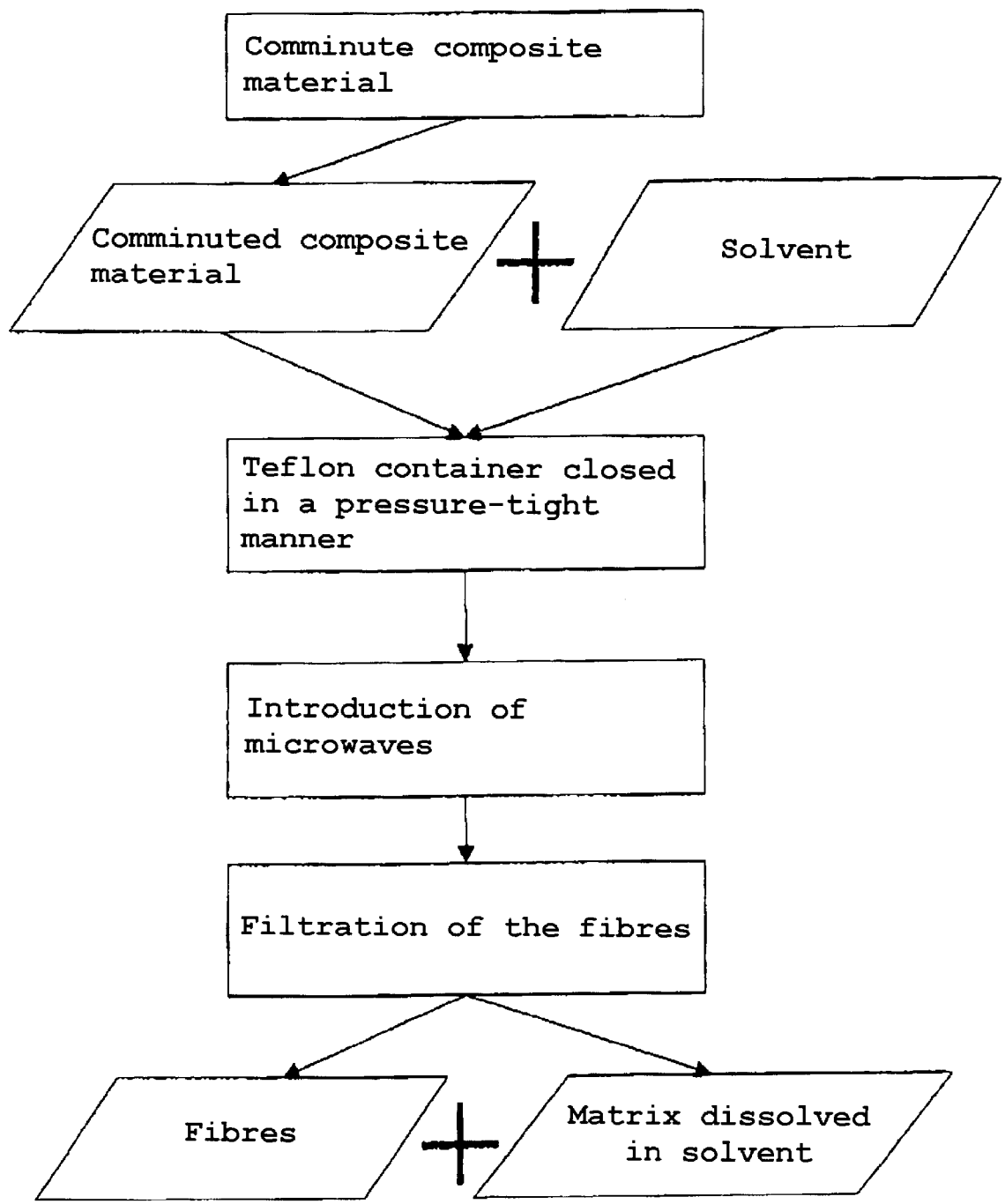
FIG. 2 shows a process diagram of the process according to the present invention on the basis of a flow diagram.

FIG. 1 shows an arrangement for carrying out the process. In this arrangement, comminuted pieces of a fiber-reinforced composite material 6 together with a solvent 5 are placed in a TEFLON® container 3, which is closed in a pressure-tight manner by a lid 4. Microwaves 2, which penetrate through the TEFLON® container 3 and interact with the solvent 5 and with an organic matrix of the composite material 6, are emitted by a microwave generator which is integrated in a microwave oven 1. The solvent and the matrix are heated, the matrix becoming separated from fibers of the composite material and being dissolved in the solvent. Then, the fibers are filtered out of the solvent. The fibers can be reused for the production of new composite materials.

Example 1

Figure 3:
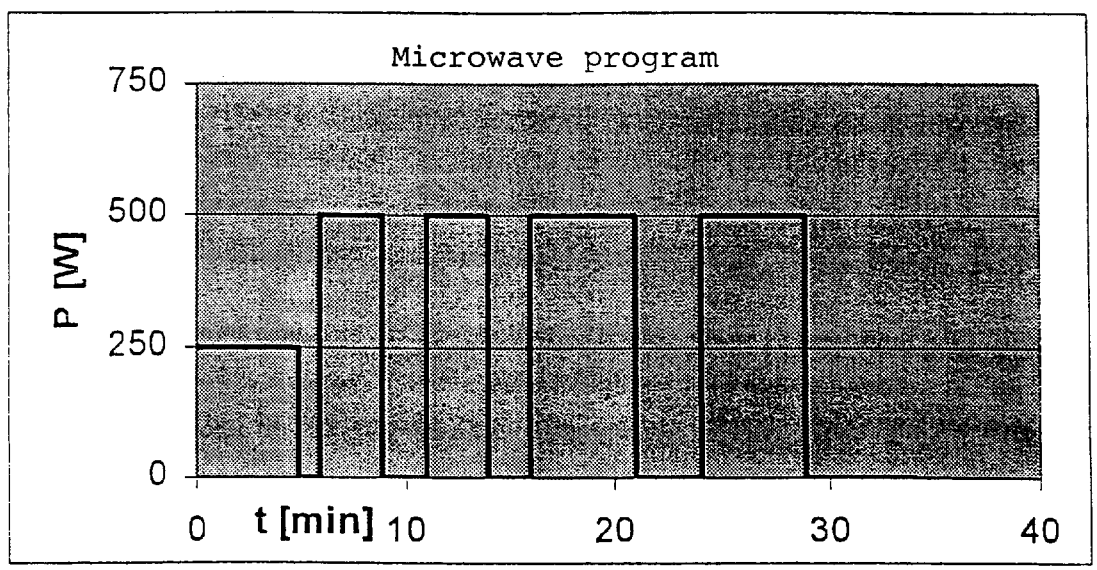
FIG. 3 shows a diagram which illustrates the microwave power introduced into the composite material as a function of the process time.

The test material used was a commercially available mixed woven fabric comprising a glass fiber-reinforced and carbon fiber-reinforced plastic. Cured epoxy resin was the plastic matrix, as used in the aircraft construction sector. A square specimen piece with an edge length of 1 cm, together with 20 ml of 48% strength sulphuric acid, in a TEFLON® container 3, was introduced into the microwave oven 1 shown in FIG. 1. A microwave program (FIG. 3), which allows an energy introduction of 0.196 Wh, was started. After the program time had ended, the content of the pressure vessel was filtered, and what remained was the carbon fibers and glass fibers. The plastic matrix had been completely removed. These fibers were rinsed using distilled water and were then dried in air.

Example 2

The test material used was a commercially available carbon fiber-reinforced plastic woven fabric. Cured epoxy was the plastic matrix, as used in the aircraft construction sector. A square specimen piece with an edge length of 1 cm, together with 20 ml of N-methylpyrrolidone, in a TEFLON® container 3, was introduced into the microwave oven 1 shown in FIG. 1. A microwave program (FIG. 3), which allows an energy introduction of 0.196 Wh, was started. After the program time had ended, the content of the pressure vessel was filtered, and what remained was the carbon fibers from which the plastic matrix had been completely removed. These fibers were rinsed using distilled water and were then dried in air.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for recycling composite materials, comprising:
    exposing a composite material comprising fibers and a matrix based on thermoplastics and/or thermosetting plastics to electromagnetic waves, thereby introducing energy to the composite material; and
    separating the matrix and the fibers,
    wherein the composite material is exposed to the electromagnetic waves in a solvent.

2. A process according to claim 1, wherein the fibers comprise at least one of ceramic fibers or metallic fibers.

3. A process according to claim 1, wherein the electromagnetic waves comprise microwaves having a frequency between 300 MHz and 300 Ghz.

4. A process according to claim 1, wherein the matrix is excited more strongly by the electromagnetic waves than the fibers.

5. A process according to claim 1, wherein the solvent is polar.

6. A process according to claim 1, wherein the composite material and the solvent are exposed to the electromagnetic waves in a container comprising polytetrafluoroethylene.

7. A process according to claim 6, wherein the container is closed in a pressure-tight manner and an excess pressure is generated in the container due to the introduction of energy.

8. A process according to claim 1, further comprising separating the fibers from the solvent by filtration.

9. A process according to claim 1, wherein the matrix comprises organic materials.

10. A process according to claim 1, wherein the matrix comprises inorganic materials.

11. A process according to claim 1, wherein the fibers comprise at least one of carbon fibers or glass fibers.

12. A process according to claim 1, wherein the fibers comprise organic fibers.

* * * * *